United States Patent [19]

Pyke et al.

[11] Patent Number: 4,996,263
[45] Date of Patent: Feb. 26, 1991

[54] HIGH MODULUS RUBBER COMPOSITION

[75] Inventors: James B. Pyke, Akron; Richard G. Bauer, Kent; Martin P. Cohen; Pawan K. Handa, both of Akron, all of Ohio

[73] Assignee: The Goodyear Tire & Rubber Company, Akron, Ohio

[21] Appl. No.: 253,839

[22] Filed: Oct. 6, 1988

[51] Int. Cl.$^5$ .............................................. C08L 77/00
[52] U.S. Cl. ................................... 525/178; 525/183;
525/184; 525/179
[58] Field of Search ................ 525/178, 181, 183, 184

[56] References Cited

U.S. PATENT DOCUMENTS

| | | |
|---|---|---|
| 4,535,119 | 5/1984 | Tanibuchi et al. . |
| 4,567,238 | 1/1986 | Sasaki et al. ......................... 525/183 |
| 4,708,987 | 11/1987 | Hergenrother et al. ............. 525/184 |
| 4,777,211 | 10/1988 | Lavengood et al. ................. 525/66 |

FOREIGN PATENT DOCUMENTS

| | | | |
|---|---|---|---|
| 6049018 | 3/1985 | Japan | ................................... 525/181 |
| 6286048 | 4/1987 | Japan . | |
| 6356514 | 3/1988 | Japan | ................................... 525/178 |

OTHER PUBLICATIONS

Fourth International Conference on Reactive Processing of Polymers, Oct. 29–31, 1986, Gardner Student Center, University of Akron (see especially Hoshino on pp. 22–27).

*Primary Examiner*—Ana L. Carrillo
*Attorney, Agent, or Firm*—Alvin T. Rockhill

[57] ABSTRACT

It is desirable to increase the modulus of rubbers utilized in a wide variety of applications. This invention discloses a technique for modifying rubbers to improve their modulus without sacrificing other properties. The subject invention more specifically relates to a process for preparing a rubber composition having a high modulus which comprises reacting maleic anhydride with at least one polydiene rubber and at least one nylon.

15 Claims, No Drawings

HIGH MODULUS RUBBER COMPOSITION

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

SUMMARY OF THE INVENTION

The subject invention discloses a technique for modifying a rubber so as to greatly increase its modulus. This results in the rubber being better suited for applications where a high degree of stiffness is desirable. However, this modification procedure does not generally sacrifice other desirable characteristics of the rubber. For instance, the rubber compositions of this invention have an increased modulus but do not have an increased degree of hysteresis.

The rubber compositions of this invention are prepared by grafting nylon onto the rubber. This is done by reacting maleic anhydride with the rubber and at least one nylon. This procedure grafts polymer chains which are comprised of nylon onto the polymer chains of the rubber.

The subject invention specifically discloses a process for preparing a rubber composition having a high modulus which comprises reacting maleic anhydride with at least one polydiene rubber and at least one nylon. In most cases from about 2 phr to about 55 phr of nylon will be utilized in the modification procedure. It is generally preferred to react the rubber with the maleic anhydride at a temperature which is within the range of about 180° C. to about 200° C. to form a rubber/maleic anhydride adduct and to subsequently react the rubber/maleic anhydride adduct with the nylon at a temperature which is at least as high as the melting point of the nylon.

DETAILED DESCRIPTION OF THE INVENTION

The process of this invention can be utilized to modify virtually any type of rubbery elastomer which contains double bonds. The rubbers which are modified in accordance with this invention typically contain repeat units which are derived from diene monomers, such as conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers that can be modified by utilizing the procedure of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. The technique of this invention is particularly well suited for utilization in modifying natural rubber, synthetic polyisoprene, and cis-1,4-polybutadiene.

Virtually any type of nylon can be utilized in preparing the rubber compositions of this invention. These nylons are polyamides which can be prepared by reacting diamines with dicarboxylic acids. The diamines and dicarboxylic acids which are utilized in preparing such nylons will generally contain from about 2 to about 12 carbon atoms. Nylons can also be prepared by addition polymerization. Nylon which is prepared by reacting hexamethylene diamine with adipic acid (hexanedioic acid) can be utilized in the process of this invention. It is generally referred to as nylon-6,6 because it is derived from a diamine which contains 6 carbon atoms and a dicarboxylic acid which contains 6 carbon atoms. Nylon-6,6 typically has a number average molecular weight of 12,000 to 20,000, is exceptionally strong, abrasion resistant, and available from a wide variety of sources.

The nylons which are preferred for utilization in the process of this invention have melting points which are within the range of about 150° C. to about 255° C. Some representative examples of such preferred nylons include nylon-6,6, nylon-6, nylon-7, nylon-8, nylon-9, nylon-10, nylon-11, nylon-12 and nylon-6,12. The most preferred nylons have melting points which are within the range of about 175° C. to about 210° C. Some representative examples of such highly preferred nylons include nylon-8, nylon-9, nylon-10, nylon-11 and nylon-12.

Polycapryllactam, which is generally referred to as nylon-8, is generally prepared by polymerizing capryllactam. This polymerization takes place readily in the melt with a small amount of amino acid initiator. Capryllactam is prepared by dimerization of butadiene to cyclooctadiene, which is hydrogenated to cycloctane, oxidized to cycloctanone, converted to the oxime with hydroxylamine, and subjected to the Beckmann rearrangement. Nylon-8 has a melting point of 200° C.

Poly(ω-aminoundecanoic acid), known as nylon-11, can be prepared by the melt polymerization of ω-aminoundecanoic acid under an inert gas atmosphere at a temperature of about 215° C. Nylon-11 has a melting point of 190° C.

Nylon-12 or poly(ω-dodecanolactam) is normally prepared by the polymerization of ω-dodecanolactam at a high temperature of at least about 300° C. utilizing an acid catalyst. ω-dodecanolactam is prepared by trimerization of butadiene to cyclododecatriene, the subsequent hydrogenation to cyclododecane, followed by oxidation to cyclododecanone, which is converted to the oxime with hydroxylamine, with the oxime being rearranged by Beckmann rearrangement to yield the ω-dodecanolactam. Nylon-12 has a melting point of 179° C. and is very highly preferred for use as the nylon in the process of this invention.

The nylons used in the process of this invention will typically have number average molecular weight which is within the range of about 8,000 to about 40,000. Such nylons will more typically have number average molecular weights which are within the range of about 10,000 to about 25,000. The nylon utilized can be capped or can have free primary amine end groups. However, nylons having free amine end groups are believed to react more quickly with maleic anhydride and are accordingly preferred.

The modified rubber compositions of this invention are prepared by simply reacting the maleic anhydride with the polydiene rubber and the nylon. This can be accomplished by simply mixing the maleic anhydride homogeneously throughout a blend of the polydiene rubber and the nylon and heating the maleic anhydride/nylon/polydiene rubber blend. The double bond in the maleic anhydride will react with the double bonds present in the polydiene rubber and the anhydride groups in the maleic anhydride will react with amine groups present in the nylon. This reaction causes nylon chains to be grafted onto the backbone of the polydiene rubber. This reaction can be depicted as follows:

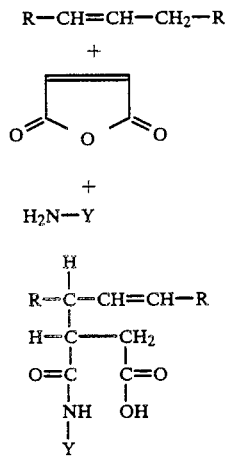

wherein R represents chains of the rubber and wherein Y represents polymer chains of the nylon. The free carboxyl groups generated by such reactions can further react with the secondary amine groups which are also generated to produce rubbers having nylon grafted thereof which can be depicted as follows:

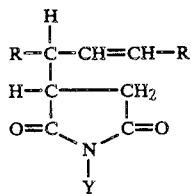

It is also theoretically possible for such free carboxyl groups to react with amine groups of other nylon chains to produce:

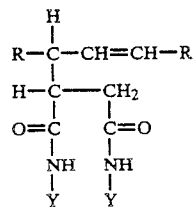

wherein two nylon chains are grafted onto the rubber by only one maleic anhydride molecule.

The modification procedure of this invention can be carried out utilizing several satisfactory techniques. For instance, the maleic anhydride, nylon, and polydiene rubber can be simultaneously mixed together and heated to graft the nylon onto the rubber. In another scenario, the maleic anhydride can be reacted with the rubber to produce a rubber/maleic anhydride adduct and the rubber/maleic anhydride adduct can then be subsequently reacted with the nylon to produce the modified rubber of this invention. In still another technique of this invention, the maleic anhydride is first reacted with the nylon to produce a nylon/maleic anhydride adduct and the nylon/maleic anhydride adduct is subsequently reacted with the rubber. It is desirable to prereact the maleic anhydride with the nylon in a first reaction step and to subsequently react the reaction product with the rubber because the rubber is subjected to elevated temperatures for a shorter duration of time and accordingly less degradation occurs.

The reaction between the maleic anhydride and the nylon will typically be carried out at a temperature which is within the range of about 150° C. to about 300° C. It will preferably be carried out at a temperature which is within the range of about 165° C. to about 250° C. and will more preferably be conducted at a temperature which is within the range of about 180° C. to about 200° C. However, such reactions between the maleic anhydride and the nylon will be carried out at a temperature which is at least as high as the melting point of the nylon Reactions between rubber/maleic anhydride adducts and nylon will also be conducted within these temperature ranges.

The reactions between rubber and maleic anhydride and the reactions between rubber and nylon/maleic anhydride adducts will typically be carried out at a temperature which is within the range of about 150° C. to about 300° C. Such reactions will more typically be conducted at temperatures which are within the range of about 165° C. to about 250° C. The preferred temperature for such reactions depends upon the rubber being utilized and the reaction mechanism. For instance, most polydiene rubbers, such as high cis-1,4-polybutadiene, medium vinyl polybutadiene, SBR, synthetic polyisoprene, natural rubber, isoprene-butadiene rubber, nitrile rubber and isoprene-butadiene-styrene rubber, will react with maleic anhydride or nylon/maleic anhydride adducts at temperatures of greater than 180° C. by an electrocyclic reaction without the need to utilize a catalyst. The most preferred temperature for conducting such reactions is accordingly from about 180° C. to about 200° C. In cases where the nylon has a melting point of above 200° C. then the preferred reaction temperature is slightly above the melting point of the nylon. Such reactions can be carried out at lower temperatures by a free radical mechanism. However, free radicals lead to gel formation and such procedures are generally not desirable. In fact, it is beneficial to conduct such reactions which are carried out utilizing electrocyclic reaction mechanisms in the presence of free radical trapping antioxidants to inhibit gel formation. Some representative examples of free radical trapping antioxidants which can be used include (1) the reaction product of p-nonyl phenol, formaldehyde, and dodecane thiol-1 (Wingstay ® K) and (2) 2-(2-hydroxy-3-t-butyl-5-methylbenzyl)4-methyl-6-t-butyl phenyl methacrylate.

EPDM rubber will generally not react with maleic anhydride or nylon/maleic anhydride adducts at commercially acceptable reaction rates by electrocyclic reaction mechanisms. For this reason, it is desirable to utilize a free radical reaction in reacting EPDM with maleic anhydride or nylon/maleic anhydride adducts. Such reactions are generally conducted at a temperature which is within the range of about 180° C. to about 210° C. Such reactions are conducted in the presence of one or more free radical catalysts. Some representative examples of free radical initiators which can be used include various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(1-butylperoxy)butyrate, 1,1-di-(t-butylperoxy) cyclohexane, and the like. Mercapto benzothiazyl disulfide is a preferred free radical catalyst.

The maleic anhydride is mixed throughout the rubber and/or the nylon utilizing conventional mixing procedures. For example, the mixing can be carried out in a Banbury mixer or a mill mixer. Normally, such blends will be prepared by mixing from about 2 phr to about 55 phr (parts per hundred parts of rubber) of the nylon throughout the polydiene rubber. The nylon can, of course, be prereacted with the maleic anhydride prior to mixing it with the rubber. In most cases it will be preferred to utilize from about 10 phr to about 50 phr of nylon in the blend. It will be typically more preferred to utilize from about 20 phr to about 45 phr of nylon in the blend. The amount of maleic anhydride utilized will typically be within the range of about 0.1 phr to about 20 phr. In most cases it will be preferred to utilize from about 0.5 phr to 3 phr. It is generally most preferred to utilize from about 0.8 phr to about 2 phr of the maleic anhydride.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLE 1

In a 280 g Brabender Preparative Mixer, 200 g of cis-polyisoprene was reacted with 2 g of maleic anhydride in the presence of 1 g of thiodiphenylamine, a high temperature antioxidant, at a rotor speed of 70 rpm and a temperature rising to 187° C. in 4 minutes. At this point, 50 g of capped nylon 12 and 1 g of Irganox 1010, an antioxidant, was added and the mixing continued for 4 minutes. The temperature was maintained at about 188° C. by adjusting the mixing speed. The rubber composition was compounded with 45 phr of carbon black, 9 phr of an oil, 2 phr of N-phenyl-N'-(1,3-dimethylbutyl)-p-phenylene diamine, 1 phr of a wax, 3 phr of stearic acid, 3 phr of zinc oxide, 0.8 phr of N-oxydiethylene benzodithiazole-2-sulfenamide, 0.4 phr of guanidine and 1.6 phr of insoluble sulfur. The rubber composition was then cured at 300° F. (149° C.) for 25 minutes. The 50% modulus, 100% modulus, tensile strength and elongation of the cured rubber samples made are reported in Table I.

EXAMPLE 2

In a preparation similar to Example 1, the conditions were the same except that an uncapped nylon 12 was used and the Irganox 1010 was replaced by 2 g of diaryl p-phenylene diamine. The initial mixing time was 3.5 minutes before the nylon was added for an additional 4 minutes for a total time of 7.5 minutes. The maximum temperature reached was 192° C. The composition was compounded and cured as in Example 1 and the cured properties are given in Table I.

EXAMPLE 3

In a preparation similar to Example 1, the conditions were the same except that a low melting copolymer of nylon 6 and 12, having a melting point of 131° C. was used. The maximum temperature reached was 177° C. The compound was cured as previously and the properties are shown in Table I.

EXAMPLE 4

In a preparation similar to Example 1, the conditions were the same except that nylon 6 was used. The maximum temperature reached was 214° C. The compound was cured as previously and the properties are shown in Table I.

EXAMPLE 5

In a preparation similar to Example 2, the conditions were the same except that 1 g of the diaryl p-phenylene diamine and 1.5 g of maleic anhydride were used, along with a capped nylon 12 in place of the uncapped material. The maximum temperature reached was 197° C. The compound was cured as previously and the properties shown are in Table I.

It would be advantageous to use a pelletized rubber for ease of measuring into continuous mixing equipment, such as an extruder. The following example illustrates the use of a pelletized cis-polyisoprene with 2 phr of fumed silica as a partitioning agent.

EXAMPLE 6

In a preparation similar to Example 2, 204 g of silica treated cis-polyisoprene pellets were used along with 1.5 g of maleic anhydride and a capped nylon 12 in place of the uncapped material. The maximum temperature reached was 193° C. The compound was cured as previously and the properties are shown in Table I.

TABLE I

| Example | Cured Properties | | | | | |
| --- | --- | --- | --- | --- | --- | --- |
| | 50%* Modulus | 100%* Modulus | Tensile* | Elongation, % | Tan Delta 0° C. | Tan Delta 60° C. |
| 1 | 5.0 | 8.8 | 15.0 | 200 | 0.069 | 0.112 |
| 2 | 5.0 | 9.5 | 12.0 | 170 | 0.107 | 0.125 |
| 3 | 2.0 | 3.3 | 19.0 | 430 | 0.095 | 0.131 |
| 4 | 2.3 | 4.1 | 13.0 | 350 | 0.134 | 0.106 |
| 5 | 4.7 | 8.7 | 14.5 | 190 | 0.096 | 0.126 |
| 6 | 5.0 | 9.1 | 15.5 | 200 | 0.089 | 0.123 |
| Control** | 1.0 | 1.7 | 22.5 | 511 | 0.157 | 0.077 |

*Given in Mega Pascals
**Standard synthetic polyisoprene (Natsyn ® 2200) was utilized as the control.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a rubber composition having a high modulus which comprises reacting maleic anhydride with at least one polydiene rubber selected from the group consisting of polybutadiene, styrene-butadiene rubber, synthetic polyisoprene, natural rubber, isoprene-butadiene rubber, isoprene-butadiene-styrene rubber, nitrile rubber, and carboxylated nitrile rubber and at least one nylon wherein an electrocyclic reaction mechanism is utilized in reacting the maleic anhydride with the rubber.

2. A process as specified in claim 1 wherein said nylon has a melting point which is within the range of about 150° C. to about 255° C.

3. A process as specified in claim 2 wherein said process is carried out at a temperature which is within the range of about 150° C. to about 300° C.; and wherein from about 0.1 parts per hundred parts of rubber to about 20 parts per hundred parts of rubber of the maleic anhydride is utilized.

4. A process as specified in claim 3 wherein said nylon is selected from the group consisting of nylon-6,6, nylon-6, nylon-7, nylon-8, nylon-9, nylon-10, nylon-11, nylon-12, and nylon-6,12; and wherein from about 2 phr to about 55 phr of the nylon is utilized.

5. A process as specified in claim 3 wherein said nylon is selected from the group consisting of nylon-8, nylon-9, nylon-10, nylon-11, and nylon-12.

6. A process as specified in claim 5 wherein the process is carried out by reacting the nylon with the maleic anhydride to produce a nylon/maleic anhydride adduct and subsequently reacting the nylon/maleic anhydride adduct with the rubber.

7. A process as specified in claim 6 wherein said process is carried out at a temperature which is within the range of about 165° C. to about 250° C.

8. A process as specified in claim 6 wherein said nylon is nylon-12.

9. A process as specified in claim 6 which is carried out in the presence of a free radical trapping antioxidant selected from the group consisting of (1) the reaction product of p-nonyl phenol, formaldehyde and dodecane thiol-1 and (2) 2-(2-hydroxy-3-t-butyl-5-methybenzyl) 4-methyl-6-t-butyl phenyl methacrylate.

10. A process as specified in claim 9 which is carried out at a temperature which is within the range of about 180° C. to about 200° C.

11. A process as specified in claim 10 wherein said polydiene rubber is selected from the group consisting of high cis-1,4-polybutadiene, styrene-butadiene rubber, synthetic polyisoprene, natural rubber and isoprene-butadiene rubber.

12. A process as specified in claim 1 wherein from about 0.5 parts per hundred parts of rubber to about 3 parts per hundred parts of rubber of the maleic anhydride is utilized.

13. A process as specified in claim 1 wherein from about 20 parts per hundred parts of rubber to about 45 parts per hundred parts of rubber of the nylon is utilized.

14. The rubber composition made by the process specified in claim 1.

15. A process for preparing a rubber composition having a high modulus which comprises reacting at least one nylon with maleic anhydride to produce a nylon/maleic anhydride adduct and subsequently reacting the nylon/maleic anhydride adduct with at least one rubber selected from the group consisting of polybutadiene, styrene-butadiene rubber, synthetic polyisoprene, natural rubber, isoprene-butadiene rubber, isoprene-butadiene-styrene rubber, nitrile rubber, and carboxylated nitrile rubber, wherein the nylon/maleic anhydride adduct is reacted with the rubber in the absence of a free radical initiator.

* * * * *